United States Patent [19]

Truck

[11] 4,250,851
[45] Feb. 17, 1981

[54] ROTARY PISTON ENGINE

[76] Inventor: Robert Truck, P.O. Box 83, Revelstoke, British Columbia, Canada

[21] Appl. No.: 67,922

[22] Filed: Aug. 20, 1979

[51] Int. Cl.³ ............................................ F02B 53/00
[52] U.S. Cl. ................................................. 123/240
[58] Field of Search ......................... 123/221, 239, 240

[56] References Cited

U.S. PATENT DOCUMENTS

| 1,899,374 | 2/1933 | Werle | 123/240 |
| 3,008,457 | 11/1961 | Mezzetta | 123/240 |

FOREIGN PATENT DOCUMENTS

| 711040 | 6/1931 | France | 123/240 |
| 512706 | 9/1939 | United Kingdom | 123/240 |
| 960103 | 6/1964 | United Kingdom | 123/240 |

Primary Examiner—Michael Koczo, Jr.
Attorney, Agent, or Firm—Fulwider, Patton, Rieber, Lee & Utecht

[57] ABSTRACT

An engine having a drive shaft secured to a rotary piston mounted within a casing. An intake-compression chamber between the casing and piston is supplied with fuel through an intake port. The rotary piston has an annular expansion-exhaust chamber and an exhaust port on the casing communicates with that chamber. A drive flap pivotally mounted on the piston swings into and out of the expansion-exhaust chamber between open and closed positions as the piston rotates, the flap thus forming a movable pressure barrier extending across the expansion-exhaust chamber. The piston has a plurality of turbine slots circumferentially spaced apart in a direction extending away from the direction of rotation of the piston so as to sweep successively across the combustion chamber and connect said chamber to the expansion-exhaust chamber. Also, a cam member is carried by the casing to project into the expansion-exhaust chamber, the member being positioned to control movement of the drive flap between the open and closed positions in timed relation to ignition of a combustible mixture within the combustion chamber. The engine produces power at high rotational speeds which are possible because of the absence of oscillating masses which must be accelerated and retarded as is the case in a conventional piston engine.

5 Claims, 7 Drawing Figures

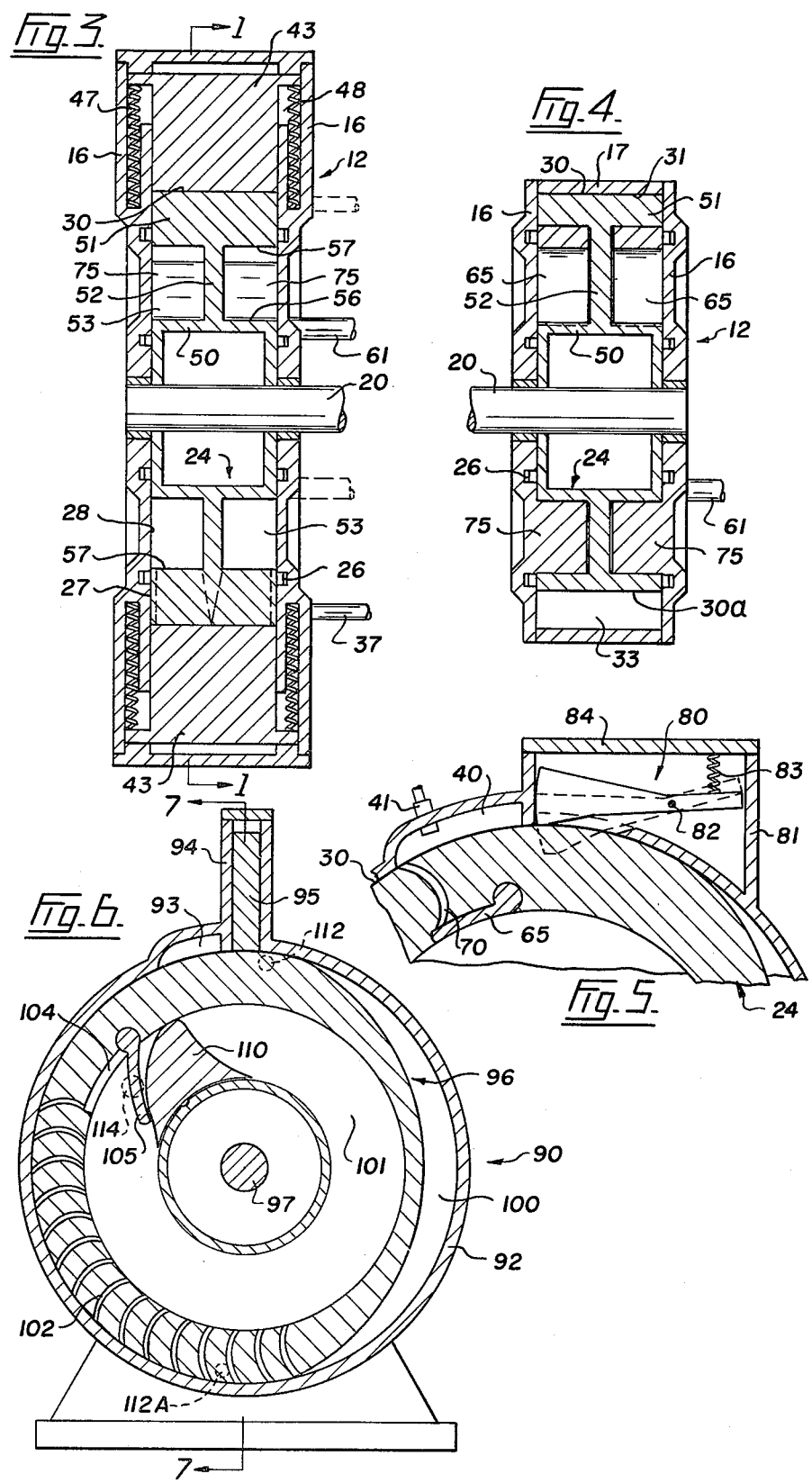

ROTARY PISTON ENGINE

BACKGROUND OF THE INVENTION

This invention relates to an internal combustion engine having a rotary piston.

The most pertinent prior art known to applicant comprises U.S. Pat. No. 1,241,303 issued Sept. 25, 1917 to M. K. Thayer; No. 3,008,457 issued June 20, 1960 to L. Mezzetta; No. 3,181,511 issued May 4, 1965 to P. B. Johnson; No. 3,527,262 issued Sept. 8, 1970 to J. C. Fuchs; and No. 3,801,237 issued Apr. 2, 1974 to J. P. Gotthold.

SUMMARY OF THE INVENTION

An engine with a rotary piston is known to have certain advantages over reciprocating piston engines but these advantages are realized only if the rotary engine has certain design characteristics. Such an engine must be capable of high rotational speeds and therefor the weight and number of moving parts should be kept to a minimum. During one high-speed revolution of the rotary piston, movements must be executed which are the equivalent of the induction, compression, power and exhaust strokes of a reciprocatory engine and this calls for a design which provides for overlapping or combining of such strokes.

The present engine meets the above as well as other design requirements by providing a rotary piston fitted with drive flaps which are moved between operative and inoperative positions automatically as the piston rotates. In the operating position, the flaps are acted upon by the pressure developed as a result of ignition and the expanding gases exert their propelling force on the flaps after travelling through slots which are shaped to act somewhat like the blades on a turbine.

More specifically, an engine according to the present invention comprises a casing having a peripheral wall provided with a circular inner surface, a rotary piston rotatably mounted within the casing, sealing means between the rotary piston and adjacent parts of the casing, said rotary piston having an outer edge partly concentric to the inner surface and partly spaced from said inner surface to provide an intake-compression chamber, said casing having a combustion chamber opposite the outer edge, an intake port on the casing positioned to register with the intake-compression chamber during rotation of the rotary piston, said rotary piston having an expansion-exhaust chamber, an exhaust port on the casing communicating with the expansion-exhaust chamber, a drive flap pivotally mounted on the rotary piston for swinging movement into and out of the expansion-exhaust chamber between open and closed positions, said rotary piston having a plurality of turbine slots circumferentially spaced apart in a direction extending away from the direction of rotation of said rotary piston, said turbine slots being positioned to sweep successively across the combustion chamber and connect said chamber to the expansion-exhaust chamber, and a cam member carried by the casing to project into the expansion-exhaust chamber, said cam member being positioned to control movement of the drive flap between the open and closed position in timed relation to ignition of a combustible mixture within the combustion chamber.

BRIEF DESCRIPTION OF THE DRAWINGS

FIG. 3 is a vertical section taken on the line 3—3 of FIG. 1, FIG. 4 is a section taken on the line 4—4 of FIG. 2, FIG. 5 is an enlarged detail section showing a modified part of sealing means between the rotary piston and a casing of the engine, FIG. 6 is a vertical section similar to FIG. 1 but showing the construction of another embodiment of the invention.

DESCRIPTION OF THE PREFERRED EMBODIMENTS

Figure 1:
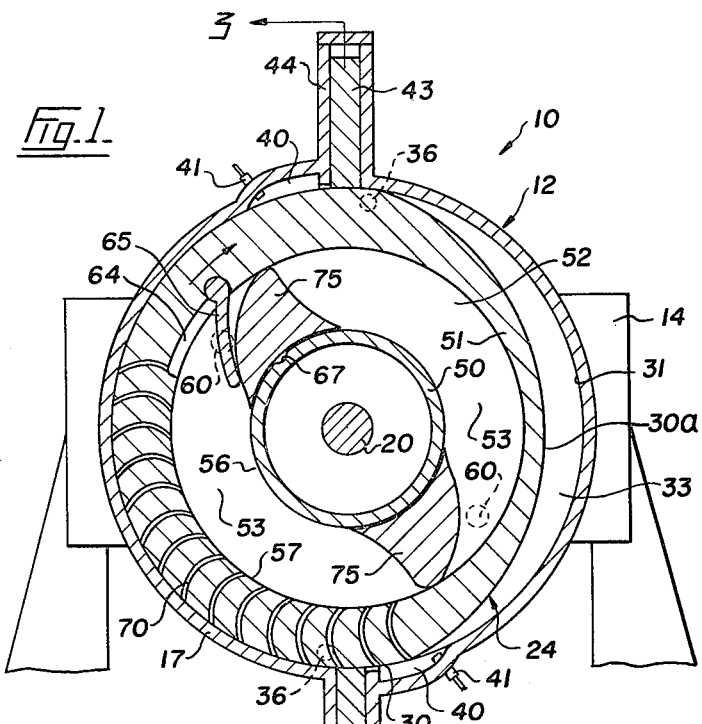
FIG. 1 is a vertical section, taken on the line 1—1 of FIG. 3, of a preferred embodiment of the present rotary piston engine.

Referring to the drawings, the numeral 10 indicates generally a rotary piston engine constructed in accordance with the present invention. The internal combustion engine 10 comprises a casing 12 which is shown supported on a suitable stand 14. Two spaced side plates 16 and a peripheral wall 17 form the major parts of the casing 12, these parts being detachably secured together by conventional fasteners which have been omitted from the drawings for sake of clarity.

A horizontal shaft 20 is journalled in the side plates 16 and secured to this power-transmitting shaft is a substantially cylindrical piston 24 which closely fits the casing. Desirably, a clearance of about 0.01 millimeters is provided between the opposing surfaces of the piston and the casing with appropriate sealing means being used therebetween wherever required. In FIGS. 3 and 4 for example, one such sealing means is shown to comprise pairs of spring-pressed rings seals 26 located between opposite sides 27 of the piston and inner faces 28 of the casing side plates.

The rotary piston 24 has an outer edge 30 which, for the most part, is circular and concentric about the axis of rotation of the shaft 20. The peripheral wall 17 of the casing has an inner surface 31 which is also concentric and circular. An arc 30a of the outer edge of the piston is reduced or made eccentric as shown in FIGS. 1 and 2 to define, with adjacent parts of the casing, an intake-compression chamber 33 which is substantially crescent-shaped.

Figure 2:
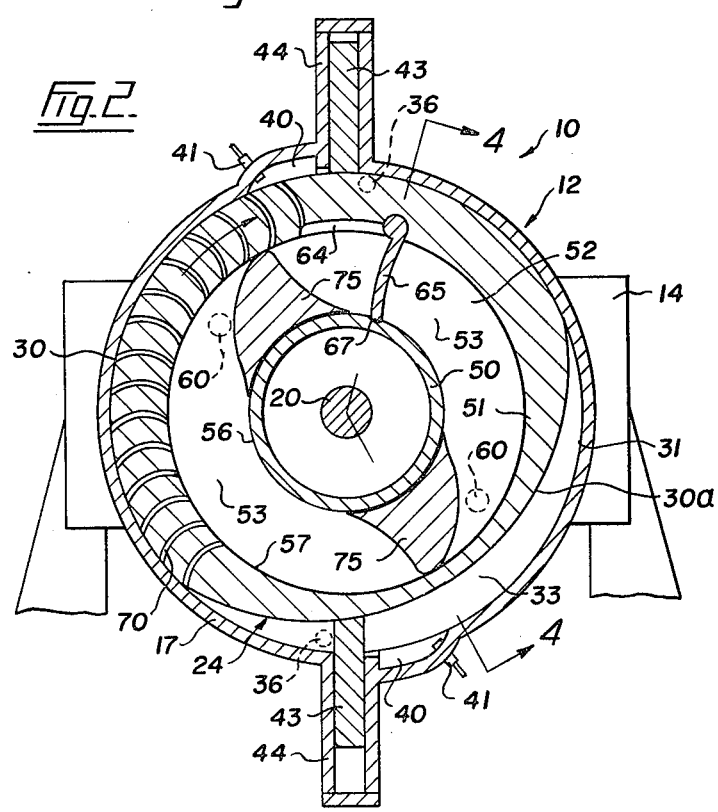
FIG. 2 is a similar vertical section showing the position of a rotary piston of the engine shortly after commencement of a power stroke.

Chamber 33 is filled with the gasoline and air mixture needed to power this particular embodiment of the invention through intake ports 36 which appear in FIGS. 1 and 2. These two ports are located on one of the side plates 16 of the casing near the peripheral wall 17 and spaced 180° apart. Thus, the intake-compression chamber 33 swings into register with the ports 36 during rotation of the piston 24 and the arrangement is such that at no time do the intake ports communicate with one another through said chamber. A pipe 37, see FIG. 3, connects each port 36 to a source (not shown) of gasoline and air. The explosive fuel-air mixture separately received by the chamber 33 through the ports 36 is compressed by rotation of the piston and is separately discharged into one of a pair of combustion chambers 40 of the engine.

The peripheral wall 17 of the casing is expanded radially to provide the engine 10 with the diametrically opposed combustion chambers 40. Each of these chambers is fitted with a spark plug 41 which forms part of a suitable ignition system, not otherwise shown.

The previously mentioned sealing means includes a pair of diametrically opposed edge seals 43. These radially disposed seals of a suitable hard wearing material are slidably mounted in housings 44 which are formed on the casing alongside the chambers 40. The edge seals can be held in continuous sealing contact with the surface 30 by mechanical or hydraulic means but, preferably, simple tension springs 47 (FIG. 3) are provided within recesses 48 formed in the side plates 16 for this purpose. The springs 47 secure the seals to the plates so that inner edges of the seals are continuously applied to the outer edge 30 of the piston which then is suitably sealed within the casing at this point.

The piston 24 has an inner hub portion 50 and an outer flange portion 51. These two portions of the piston are connected by a central web 52 so as to define two annular recesses which are subdivided as will be described later provide the piston with four expansion-exhaust chambers 53 extending into the sides 27 of the piston. The portions 50 and 51 have opposing surfaces 56 and 57 respectively, which surfaces are circular and concentric about the axis of rotation of the piston.

In FIGS. 1 and 2, the casing 12 will be seen to be provided with exhaust ports 60. Two such ports are provided in each of the side plates 16 near the surfaces 57 and spaced 180° apart so that each port connects with one of the four exhaust-expansion chambers 53. A pipe 61 connects each of the four ports 60 to an exhaust manifold, not shown.

The surfaces 57 on either side of the web 52 are recessed as at 64 and pivotally mounted in these recesses are two side-by-side drive flaps 65. Piston 24 is intended to rotate clockwise as shown in FIG. 1 for example, and the drive flaps are mounted so as to swing into and out of the chambers 53. Thus, the flaps have a fully-closed position during which they are housed within their recesses 64 and a fully-open position during which their free or trailing edges at times are seated in sealing notches 67 provided on the surfaces 56 of the hub portion, see FIGS. 1 and 2.

The combustion chambers 40 communicate with the expansion-exhaust chambers 53 through a plurality of turbine slots 70 which are formed in the flange portion 51 of the piston. These slots extend inwardly from the outer edge 30 of the piston and have bends about midway through the flange portion before angling in a reverse direction towards the surfaces 57. Furthermore, the turbine slots are circumferentially spaced apart along the flanged portion to extend in two spaced-apart rows (FIG. 3) away from the direction of rotation of the piston a distance about one third the circumference of the piston. The slots of each row then include a leading slot as well as a trailing slot. The inner ends of each leading slot connects with one of the recesses 64 and, when the flap 65 of that recess is in the closed position, the leading slot is partially blocked by the trailing edge of the flap. By this means, the drive flaps 65 initially are moved out of the recesses 64 and are simultaneously swung to their open positions by the force of expanding gases resulting from the firing of an explosive charge in a combustion chamber and subsequently are returned simultaneously to their closed positions by means of pairs of cams 75.

It is the cams 75 which subdivide the annular recesses in the piston into the four expansion-exhaust chambers as previously mentioned. Each diametrically opposed pair of cams 75 is integrally formed on an inner face 28 of one of the side plates so as to project into the annular recesses and divide those recesses into the expansion-exhaust chambers 53, see FIGS. 3 and 4. These cams are disposed in the paths of travel of the flaps 65 and are shaped so as to urge the flaps to the closed position and to allow the flaps to be swung to the open position by the pressure of the expanding gases resulting from ignition.

The engine 10 has a lubricating system which has not been illustrated, the system providing a supply of oil to ensure a smooth, cool operation and the cooling action may be augmented by suitable fins or water jackets on the exterior of the casing.

Operation of the rotary piston engine 10 can best be understood with reference first to FIG. 1 in which the uppermost chamber 40 is ready to be fired while the lowermost combustion chamber is about to receive a charge of compressed fuel and air. The charge ready to be fired within the uppermost chamber 40 was received in the intake-compression chamber 33 through the lowermost intake port 36 as that chamber swept past the port during the earlier partial rotation (slightly less than 150°) of the piston 24 thus providing the equivalent of a combined induction and compression stroke for the engine 10. It will be noted that firing takes place when the leading slots 70 are spaced about 50° from the adjacent and of the combustion chamber. The flaps 65 at this time are being moved by their cams 75 towards their closed positions. As the combustible charge in the uppermost chamber 40 is fired by the sparking of its plug 41, the drive flaps 65 are ejected out of their recesses 64 by the expanding gases of combustion. The drive flaps swing to their open positions with their free edges moving down the cams to lodge in the sealing notches 67 as shown in FIG. 2. Continued expansion of those gases exert a driving force on the now fully-open flaps and this force is transmitted to the flange portion 51 to drive the rotary piston in the clockwise direction indicated in FIG. 1. The turbine slots successively sweep passed the combustion chamber and the driving force behind the open flaps is maintained until the flaps start to move to their closed positions as a result of coming into contact with the other two cams 75 near the lowermost combustion chamber. The curvature of the slots 70 is such that they serve the same purpose as conventional turbine blades and the reaction also drives the rotary piston.

As the above described power stroke occurs, the chambers 53 ahead of the open drive flaps 65 are swept clear of exhaust gases from the preceding explosion with those gases discharging from the casing through the lowermost exhaust ports 60. Thus, the power and exhaust strokes of the engine occur almost simultaneously as the piston rotates slightly less than 120°.

The lowermost combustion chamber 40 is about to be charged when the rotary piston 24 is in the position shown in FIG. 1. Chamber 33 earlier received a quantity of the fuel-air mixture drawn in through the uppermost intake port 36. Ignition of the compressed charge in the lowermost combustion chamber again occurs as the two rows of turbine slots 70 are approximately 50° from that chamber. The explosive force reaching the chambers 53 through the turbine slots swings the flaps open and continues to propel the rotary piston clockwise. The gases of combustion resulting from ignition of the charge within the lowermost combustion chamber are swept through the uppermost exhaust ports 60 thus providing a second combined power-exhaust stroke for 360° of travel of the piston. The main sweeping action is by the flaps but, as the flaps close, the exhaust ports are momentarily in communication with the chamber 33 through the trailing slots and incoming air reaching that chamber through the intake ports forces the remaining exhaust gases out through exhaust ports thus ensuring complete scavaging. The induction, compression, power and exhaust strokes takes place in the required sequence so that each of the four strokes being repeated twice for each complete revolution of the rotary piston 24.

In FIG. 5, the numeral 80 indicates generally a modified seal which may form part of the sealing means. This seal is enclosed with an appropriately shaped housing 81 so as to rock about a transverse pivot pin 82 carried by that housing. A tension spring 83 secures one end of the seal to a cap 84 on the housing whereby to bias the opposite or inner edge of the seal into sliding engagement with the outer edge 30 of the rotary piston. Another such seal is provided on the opposite side of the casing, the arrangement being the same as for the edge seals 43. Thus, a pressure barrier is provided between the rotor and the casing near each combustion chamber.

Figure 7:
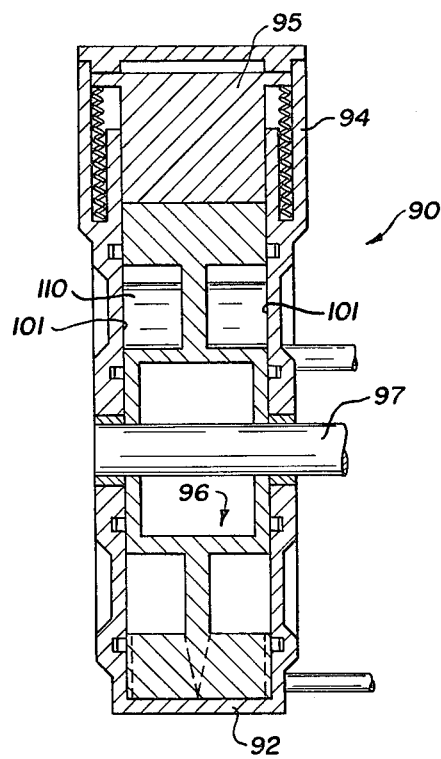
FIG. 7 is a vertical section taken on the line 7—7 of FIG. 6.

Referring now to FIGS. 6 and 7, the numeral 90 indicates generally another embodiment of the rotary piston engine. Engine 90 is intended to be powered by diesel fuel and therefor no ignition system is required since the combustible mixture is fired by compression. However, a conventional fuel-injection system (not shown) is provided for the engine 90. The engine may be used to drive a low-pressure water pump or the like in which case the engine would be simplified as shown in FIGS. 6 and 7 and as will now be described. Engine 90 is shown to have a stand-mounted casing 92 which has a single combustion chamber 93. A housing 94 is provided near the chamber 93 and a radially disposed and spring-pressed seal 95 is mounted in the housing. A rotary piston 96 rotates within te casing, the piston being mounted on a shaft 97 an being shaped to provide an intake-compression chamber 100. Piston 96 has an expansion-exhaust chamber 101 and a row of turbine slots 102. A recess 104 is formed in the piston to receive a pivotally mounted drive flap 105. Movement of the flap 105 into and out of the expansion-exhaust chamber 101 is controlled by a cam 110 carried by the casing to extend into this chamber. The casing 92 is provided with an intake port 112 which is swept by the chamber 100 and an exhaust port 114 which connects with the chamber 101. If desired, the engine 90 may be supercharged by conventional equipment used for this purpose. The casing 92 is provided with another inlet port 112a (FIG. 6) when the engine is supercharged.

In operation, rotation of the piston 96 allows a volume of air to enter the chamber 100 through the port 112 so that the volume subsequently is compressed and deposited in the chamber 93. Fuel is injected into the chamber 93 when the piston is in the position shown in FIG. 6 (leading turbine slot some 50° from combustion chamber) whereupon the flap 105 is first closed by the cam 110 and then is allowed by the cam to swing to the open position as the turbine slots 102 travel across the combustion chamber 93. The force of the explosion reacts against the shaped slots and the open flap to drive the piston clockwise. As before, the spent gases from the preceding explosion are swept out of the chamber 101 and through the exhaust port 114 in advance of the flap during the power stroke.

From the foregoing, it will be apparent the present invention provides an engine in which high speeds of rotation are possible and correspondingly high power outputs can be achieved. The fuel-air mixture is ignited in the combustion chamber and is confined to burn of a predetermined period equal to about 50° of travel of the rotary piston before the resulting expanding gases are allowed to escape and exert a driving force on the piston. This assures almost complete combustion which reduces pollution and that a maximum driving force is applied to the piston. The application of torque to the piston is nearly continuous and the rotary piston itself is a flywheel so that rotation is particularly smooth or vibration free.

I claim:

1. An internal combustion engine comprising a casing having a peripheral wall provided with a circular inner surface, a rotary piston rotatably mounted within the casing, sealing means between the rotary piston and adjacent parts of the casing, said rotary piston having an outer edge partly concentric to the inner surface and partly spaced from said inner surface to provide an intake-compression chamber, said casing having a combustion chamber opposite the outer edge, an intake port on the casing positioned to register with the intake-compression chamber during rotation of the rotary piston, said rotary piston having an expansion-exhaust chamber, an exhaust port on the casing communicating with the expansion-exhaust chamber, a drive flap pivotally mounted on the rotary piston for swinging movement into and out of the expansion-exhaust chamber between open and closed positions, said rotary piston having a plurality of turbine slots circumferentially spaced apart in a direction extending away from the direction of rotation of said rotary piston, said turbine slots being positioned to sweep successively across the combustion chamber and connect said chamber to the expansion-exhaust chamber, and a cam member carried by the casing to project into the expansion-exhaust chamber, said cam member being positioned to control movement of the drive flap between the open and closed position in timed relation to ignition of a combustible mixture within the combustion chamber.

2. An internal combustion engine as claimed in claim 1, in which said sealing means includes a seal movably supported by the casing adjacent the combustion chamber, and spring means for maintaining an inner end of the seal in continuous sealing contact with the outer edge of the rotary piston whereby to provide a pressure barrier for the intake-compression chamber.

3. An internal combustion engine as claimed in claim 1, in which said turbine slots includes a leading slot having an inner end at least partially blocked by a free end of the drive flap whereby said flap is blown towards the open position in response to ignition of the combustible mixture.

4. An internal combustion engine comprising a casing, a rotary piston rotatably and sealingly mounted within the casing, said casing having a peripheral wall provided with a circular inner surface, said rotary piston having a mainly circular outer edge with an arc thereof spaced from the inner surface to provide an intake-compression chamber, said casing having circumferentially spaced intake ports adapted to be swept by the intake-compression chamber, a pair of diametrically opposed combustion chambers on the casing facing the outer edge, a housing on the casing adjacent each combustion chamber, a seal movably supported by each housing, means for maintaining ends of the seals in continuous sealing contact with the outer edge, said rotary piston having an inner hub portion and an outer flange portion radially spaced apart and connected by a central web to provide expansion-exhaust chambers, exhaust ports arranged on the casing to separately communicate with the expansion-exhaust chambers, a pair of drive flaps pivotally mounted on the inner portion for swinging movement into and out of the expansion-exhaust chambers and between open and closed positions, said outer flange portion having a row of turbine slots near each drive flap extending from the outer edge to connect with adjacent expansion-exhaust chambers, the turbine slots of each row being circumferentially spaced apart in a direction away from the direction of rotation of the rotary piston and being positioned to sweep across the combustion chambers and transfer expanding gases resulting from ignition of the combustible mixture in said chambers to the expansion-exhaust chambers whereby to exert a rotor-driving force aginst the open drive flaps, each row of turbine slots including a leading slot having an inner end adapted to be partially blocked by a free end of an adjacent drive flap when said flap is in the closed position, and cam members carried by the casing in the paths of travel of the drive flaps whereby to control movement of the drive flaps between open and closed positions in timed relation to the firing of charges of fuel-air mixture within the combustion chambers.

5. An internal combustion engine as claimed in claim 1 or claim 4, in which each of said turbine slots is shaped along the length thereof whereby an additional driving force is exerted on the rotary piston by the expanding gases resulting from ignition.

* * * * *